United States Patent

Toeppen et al.

[15] 3,681,732

[45] Aug. 1, 1972

[54] THERMAL DETECTOR

[72] Inventors: Thurston H. Toeppen, Poughkeepsie, N.Y.; David M. Sanger, Livingston, N.J.

[73] Assignee: General Signal Corporation, Rochester, N.Y.

[22] Filed: May 12, 1970

[21] Appl. No.: 36,506

[52] U.S. Cl. ....................337/409

[51] Int. Cl. ....................H01h 37/76

[58] Field of Search........337/108, 219, 265, 267, 79, 337/409, 402, 244, 200; 339/127 R; 200/168 B, 168 C; 174/61, 62

[56] References Cited

UNITED STATES PATENTS

| | | | |
|---|---|---|---|
| 3,047,829 | 7/1962 | Mouat | 339/127 |
| 1,723,471 | 8/1929 | Dunham | 339/127 |
| 3,171,935 | 3/1965 | Gloeckler | 337/409 |
| 3,271,547 | 9/1966 | Seeley | 337/409 |

*Primary Examiner*—Bernard A. Gilheany
*Assistant Examiner*—F. E. Bell
*Attorney*—Harold S. Wynn and Milton E. Kleinman

[57] ABSTRACT

A thermal detector is provided for mounting on an outlet box cover. The thermal detector has a central cylindrical portion in its base containing wire terminals. The cylindrical portion of the base is detachably locked within a central opening in the outlet box cover. Means is provided on the outside of the detector for manifesting when it has been actuated.

14 Claims, 3 Drawing Figures

PATENTED AUG 1 1972

3,681,732

THERMAL DETECTOR

While the invention is subject to a wide range of applications, it is especially suited for use in a thermal detector and will be particularly described in that connection.

Thermal detectors are generally adapted for mounting over an outlet box on the ceiling or the side wall of a room by having provision for mounting screws extending through the detector and threading into the wall or into the outlet box. Other detectors are provided with fasteners that permit the thermal detectors to be readily detachable from the associated outlet box. Some of these mountings have proven to be expensive and insecure.

Also most thermal detectors of the prior art do not readily manifest whether or not they have been actuated by casual inspection of the detector as mounted on a wall or ceiling, at some distance from the observer.

An object of the present invention is to provide a thermal detector having improved mounting means.

Another object of the present invention is to provide a thermal detector having improved means for manifesting when the detector has been actuated.

SUMMARY OF INVENTION

A thermal detector is provided for mounting on an electrical outlet box wherein the improvement comprises a cover plate adapted to be secured to the outlet box having a substantially large central opening. The thermal detector has a base plate having a central cylindrical portion housing wire connection terminals, and the cylindrical portion is adapted to be inserted and detachably locked within the central opening in the cover plate.

The thermal detector has thermal sensing means including a housing secured to a base plate supporting a spring biased contact actuating pin having one end extending through the housing. A heat collector is secured to the pin by low temperature solder, and a resilient tab connecting the housing and the heat collector is provided for causing the heat collector to be suspended from the housing in an abnormal position in response to melting of the solder to manifest that the sensing means has been actuated.

For a better understanding of the present invention, together with other and further objects thereof, reference is had to the following description taken in connection with the accompanying drawings.

Figure 1:
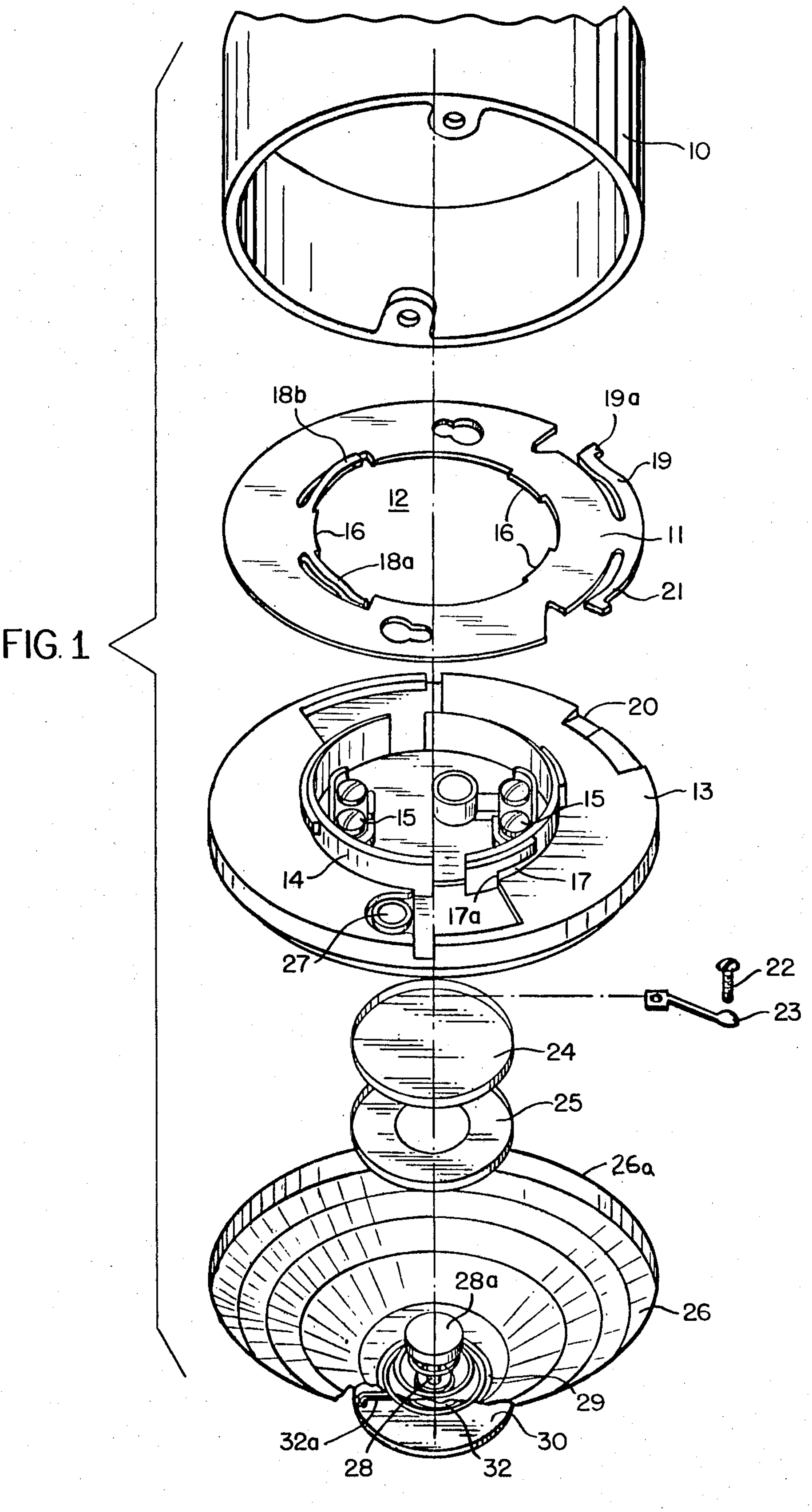
FIG. 1 is an exploded perspective view of a thermal detector adapted to be secured to an outlet box according to a preferred embodiment of the present invention.

With reference to FIG. 1, a thermal detector is illustrated for mounting on an electrical outlet box 10. The thermal detector has a cover plate 11 which is adapted to be secured to outlet box 10 as a cover. This plate has a relatively large central opening 12.

The thermal detector has a base plate 13 having a central cylindrical portion 14 extending upwardly therefrom housing wire connection terminals 15. The cylindrical portion 14 is adapted to be inserted and detachably locked within the opening 12 of the cover plate 11.

The cover plate 11 has a plurality of arcuate keys 16 extending partly around the periphery of the opening 12 for engagement in corresponding keyways such as the keyway 17 of the base plate 13 upon rotation of the base plate relative to the cover plate after insertion of the cylindrical portion 14 within the opening 12 of the cover plate.

The cover plate 11 has detents 18*a* and 18*b* for biasing the base plate 13 perpendicularly with respect to the cover plate 11. The detent 18*a* is bent downwardly, while the opposing detent 18*b* is bent upwardly, so that the base plate 13 can be biased away from the cover plate 11 irrespective of which side of the cover plate 11 is secured to the outlet box 10. This makes the mounting of the thermal detector secure and guards against the possibility of the thermal detector rattling or vibrating in its mounting.

The keyway 17, and similar keyways on the circumference of the cylindrical portion 14 (not shown), has a shoulder 17*a* which serves as a stop to limit the rotation in a clockwise direction of the base plate 13 relative to the cover plate 11. A spring detent 19 formed at the outer periphery of the cover plate 11 is formed downwardly from the lower surface of the cover plate 11 to engage behind a stop 20 formed at the periphery of the base plate 13. Thus in assembling the base plate 13 to the cover plate 11, the cylindrical portion 14 of the base plate is inserted in the opening 12 of the cover plate and rotated in a clockwise direction until the keys 16 of the cover plate engage the stops 17*a* of the base plate 13. At this time, the detent 19 is positioned so that its extended end 19*a* drops behind stop 20 in the base plate 13 so as to prevent rotation of the base plate in a counter-clockwise direction. The base plate 13 is thereby locked against rotation in either direction unless the detent 19*a* is raised as by inserting a suitable tool from the periphery of the base plate 13 behind the portion 19*a* to raise this portion over the stop 20 in the base plate 13 to permit rotation of the base plate 13 in a counter-clockwise direction. It will be noted that there is another oppositely disposed arcuate detent 21 formed upwardly in the periphery of the cover plate 11, comparable to the detent 19, that is used in case the cover plate 11 is secured to the outlet box 10 the other side up.

Contacts 22 and 23 are riveted to respective wire terminals 15 through the base 13 and are positioned to be normally open. The contact 23 is a movable contact that is disposed opposite fixed contact point 22, and is subject to actuation by pressure on a diaphragm 24 of flexible material. The diaphragm 24 is seated along a ring formed in the underside of the base plate 13 so as to be disposed adjacent to the contacts 22 and 23. A suitable rigid shield 25 is preferably used over the diaphragm 24 to restrict the movement of the diaphragm away from contact 23 while permitting free movement toward the contact. By this means, diaphragm 24 is free to actuate the movable contact 23 either in response to a rise of air pressure within the thermal detector, or in response to the sensing of a fixed temperature at which the thermal detector is designed to be actuated.

The diaphragm 24 constitutes a portion of the wall of a substantially air tight enclosure 26, the outer housing 26*a* of which is of metal to facilitate heating of the enclosed air in response to any temperature rise of the atmosphere in the room. This will in turn lead to heating of the air within the enclosure, with a consequent rise in the internal air pressure. The internal pressure is vented at a controlled rate by means of a filter 27 in a small opening through base 13 to the atmosphere. Whenever the rate of increase of internal pressure exceeds the rate of venting by a predetermined amount, diaphragm 24 will move sufficiently to close the contact circuit. Any pressure differential resulting from slower changes in the ambient temperature, or from normal atmospheric pressure changes, will be equalized by leakage through filter 27.

An actuating pin or plunger 28 is axially disposed opposite the contact finger 23 and has its lower end extending through the housing 26*a* and secured against the bias of a spring 29 to a metal heat collector disc 30 by low temperature solder 31. The pin 28 is journalled by a suitable sealing grommet 32 which has a resilient tab 32*a* extending therefrom and connected to the outer periphery of heat collector disc 30.

Figures 2, 3:
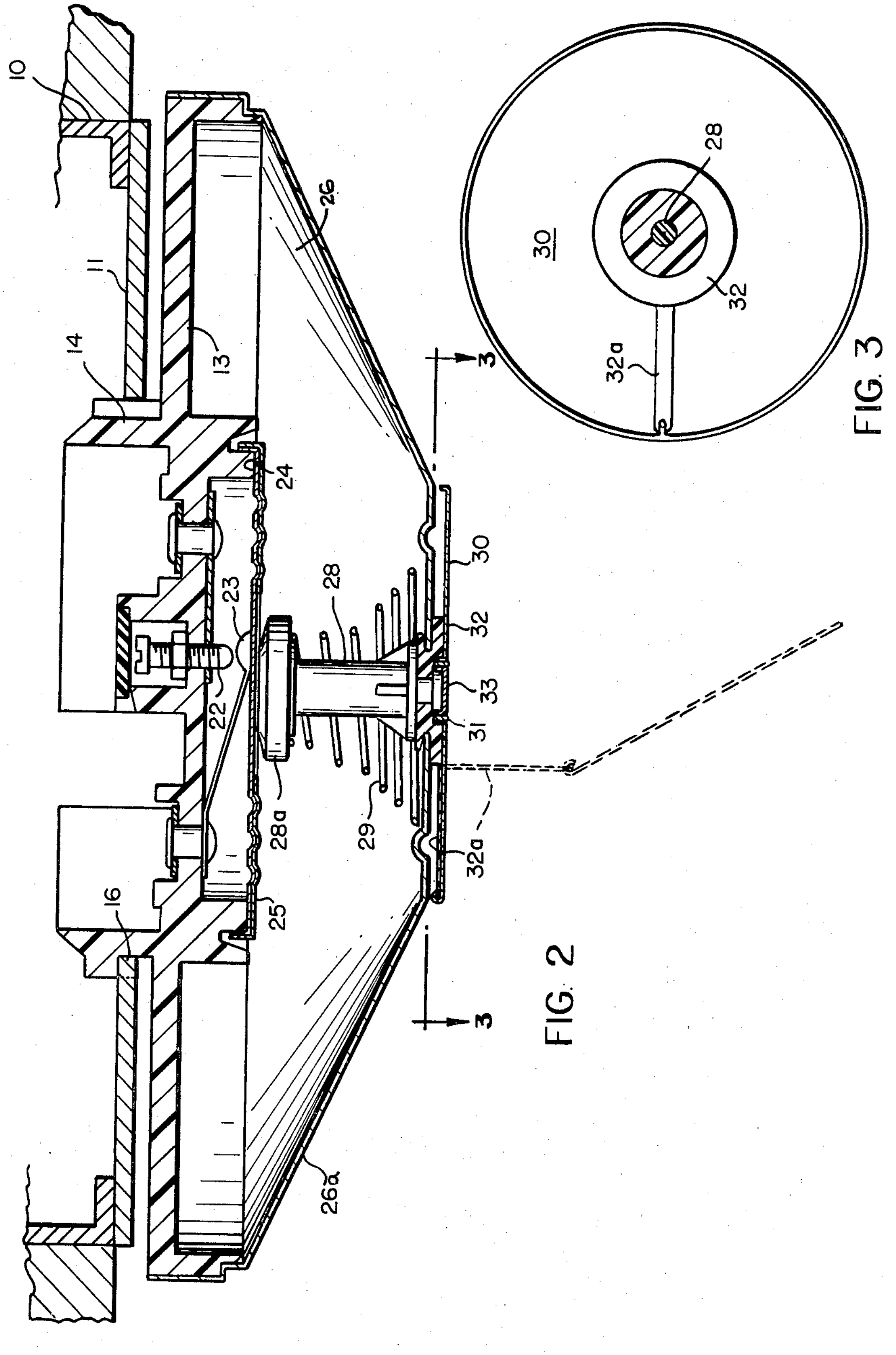
FIG. 2 is an elevational view partly in cross section of the thermal detector according to the embodiment of FIG. 1.
FIG. 3 is a plan view partially in cross section of a portion of the detector of FIG. 2, taken along the section line 3—3 of FIG. 2.

Operation of the thermal detector in response to a rise in temperature to a designed trigger level is accomplished by the melting of the low temperature solder 31 which releases the actuating pin 28 from collector disc 30, allowing the pin to be biased by the spring 29 against the diaphragm 24, and causing contacts 22 and 23 to close an electrical circuit for indication at a remote point that the thermal detector has been actuated. Upon the melting of the solder 31, the heat collector disc 30 also drops away from its normal position and is suspended by the tab 32*a* as is shown by dotted lines in FIG. 2. This clearly manifests to an observer in the room that the sensing means has been actuated and that a remote indication of the actuation should have been provided. It also serves to identify which one of a series of detectors has been triggered.

The pin 28 may be of plastic material with an enlarged operating head 28*a*. A metal cap 33 is secured to the lower end of the pin 28, and the cap 33 is secured to the heat collector 30 by the low temperature solder 31 which fills an annular joint between cap 33 and a central opening in heat collector disc 30. The heat collector disc 30 is biased by the spring 29 against the grommet 32 under normal conditions. Thus release of the plunger 28 to actuate the contact 33 is dependent upon the melting of the solder 31 to release actuating pin 28 from the heat collector disc 30.

While there has been described what is at present considered to be the preferred embodiment of the invention, it will be obvious to those skilled in the art that various changes and modifications may be made therein without departing from the invention.

What is claimed is:

1. A thermal detector assembly for mounting a thermal detector on an electrical outlet box wherein the improvement comprises, a. a cover plate for the outlet box having a substantially large central opening, b. a base plate for the thermal detector having a central cylindrical portion housing wire connection terminals, the cylindrical portion and the cover plate having coupling means partly on the cylindrical portion and partly on the cover plate for detachably locking the cylindrical portion within the central opening in the cover plate, and a heat sensing means secured to and enclosing a portion of said base plate for actuation of a switch means connected to said terminals in response to a rise in temperature above a normal level.

2. A thermal detector according to claim 1 wherein the cover plate has at least one arcuate shaped key detent extending part way around the periphery of the central opening for engagement in a keyway of the base plate upon rotation of the base plate relative to the cover plate for detachably securing the base plate to the cover.

3. A thermal detector according to claim 2 wherein there is at least one spring detent protruding from a surface of the cover plate to spring bias the base plate laterally relative to the cover plate.

4. A thermal detector according to claim 1 wherein a keyway in the base plate limits rotation of the cylindrical portion of the base plate within the opening in the cover plate in one direction.

5. A thermal detector according to claim 4 wherein there is a detent and cooperating stop for limiting rotation of the base plate in the other direction to prevent removal of the base plate from the cover plate.

6. A thermal detector according to claim 5 wherein the detent is accessible from the periphery of the base plate for disengagement from the stop to permit removal of the detector from the cover plate.

7. A thermal detector according to claim 5 wherein the detent is an arcuate spring at the periphery of the cover plate for engagement with a stop formed in the base plate.

8. A thermal detector according to claim 7 wherein there are at least two arcuate spring detents near the periphery of the cover plate protruding from opposite surfaces respectively of the cover plate to permit mounting of the base plate adjoining either surface of the cover plate.

9. A thermal detector according to claim 1 wherein contacts are secured to the wire terminals and means including a spring biased pin is provided for actuating the contacts when released by the melting of low temperature solder which normally maintains the pin disengaged from the contacts.

10. A thermal detector according to claim 9 wherein the actuating means includes a housing secured to the base for enclosing the contacts and the contact actuating pin extends through an opening in the housing and is maintained biased by a spring by reason of being connected by the low temperature solder to a heat collector on the outside of the housing.

11. A thermal detector according to claim 10 wherein resilient tab connecting means is provided for securing an off center portion of the heat collector to the housing whereby the heat collector is hinged to drop away from the housing on one side upon the melting of the low temperature solder to manifest that the thermal detector has been actuated.

12. A thermal detector according to claim 11 wherein a diaphragm is disposed between the contacts and the actuating pin whereby the contacts can also be actuated by a rapid rise in the pressure of air within the housing.

13. A thermal detector according to claim 10 wherein a grommet is provided for journalling the actuating pin and the grommet has an extended resilient tab secured to an off center portion of the heat collector to permit the heat collector to drop a limited distance away from the housing upon the melting of the low temperature solder to manifest that the thermal detector has been actuated.

14. A thermal detector for mounting on an electrical outlet box comprising;

a. a cover plate for the outlet box, b. a base plate secured to the cover plate, c. heat sensing means secured to the base plate for actuation in response to a rise in temperature above a normal level comprising, 1. a housing secured to the base plate supporting a spring biased contact actuating pin having one end extending through the housing,
2. a heat collector secured to the pin by low temperature solder, and
3. a resilient tab connecting the housing and the heat collector for causing the heat collector to be suspended from the housing in an abnormal position in response to melting of the solder to manifest that the sensing means has been actuated.

* * * * *